(12) United States Patent
Hu et al.

(10) Patent No.: US 11,127,156 B2
(45) Date of Patent: Sep. 21, 2021

(54) METHOD OF DEVICE TRACKING, TERMINAL DEVICE, AND STORAGE MEDIUM

(71) Applicant: GUANGDONG VIRTUAL REALITY TECHNOLOGY CO., LTD., Guangzhou (CN)

(72) Inventors: Yongtao Hu, Guangzhou (CN); Guoxing Yu, Guangzhou (CN); Jingwen Dai, Guangzhou (CN)

(73) Assignee: GUANGDONG VIRTUAL REALITY TECHNOLOGY CO., LTD., Guangzhou (CN)

( * ) Notice: Subject to any disclaimer, the term of this patent is extended or adjusted under 35 U.S.C. 154(b) by 100 days.

(21) Appl. No.: 16/687,699

(22) Filed: Nov. 19, 2019

(65) Prior Publication Data

US 2020/0090365 A1 Mar. 19, 2020

Related U.S. Application Data

(63) Continuation of application No. PCT/CN2019/098200, filed on Jul. 29, 2019.

(30) Foreign Application Priority Data

Aug. 2, 2018 (CN) .......................... 201810891134.5
Jul. 16, 2019 (CN) .......................... 201910642093.0

(51) Int. Cl.
*G06T 7/73* (2017.01)
*G01C 19/32* (2006.01)
*G01C 19/34* (2006.01)
*G06F 1/16* (2006.01)

(52) U.S. Cl.
CPC ................ *G06T 7/73* (2017.01); *G01C 19/32* (2013.01); *G01C 19/34* (2013.01); *G06F 1/1694* (2013.01); *G06T 2207/30204* (2013.01)

(58) Field of Classification Search
CPC . G06T 7/73; G06T 2207/30204; G01C 19/32; G01C 19/34; G01C 21/206; G06F 1/1694; G06F 3/012; G06F 3/0304; G06F 1/1686; G06F 1/163; G06F 3/011; G06F 3/0346
USPC ......................................................... 382/103
See application file for complete search history.

(56) References Cited

U.S. PATENT DOCUMENTS

| | | | | |
|---|---|---|---|---|
| 2013/0120582 A1* | 5/2013 | Daniels | ................... | G06T 5/006 348/157 |
| 2014/0067317 A1* | 3/2014 | Kobayashi | ............... | G05D 3/00 702/153 |
| 2014/0126771 A1* | 5/2014 | Ramanandan | ............ | G06T 7/70 382/103 |
| 2016/0212338 A1* | 7/2016 | Seok | ..................... | G06T 3/4038 |

(Continued)

FOREIGN PATENT DOCUMENTS

CN 103869814 A 6/2014
CN 106296801 A 1/2017
(Continued)

*Primary Examiner* — Jerome Grant, II

(57) ABSTRACT

A method of device tracking is provided. Based on a captured image containing a marker, first spatial position is acquired. Based on a captured image of a scene, second spatial position is acquired. Based on at least one of the first spatial position and the second spatial position, a terminal device may be positioned and tracked.

20 Claims, 10 Drawing Sheets

(56) References Cited

U.S. PATENT DOCUMENTS

| | | | |
|---|---|---|---|
| 2017/0371406 A1* | 12/2017 | Yang | G06T 7/80 |
| 2018/0194007 A1* | 7/2018 | Namiki | B25J 19/04 |
| 2019/0206078 A1* | 7/2019 | Lin | G06T 7/74 |
| 2019/0387978 A1* | 12/2019 | Kitamura | A61B 5/02225 |
| 2020/0331471 A1* | 10/2020 | Takahashi | G01S 13/867 |
| 2020/0359543 A1* | 11/2020 | Dix | G05D 1/0088 |
| 2020/0374470 A1* | 11/2020 | Lyu | G06T 7/0002 |
| 2020/0394820 A1* | 12/2020 | Rohde | G01S 7/4972 |

FOREIGN PATENT DOCUMENTS

| | | |
|---|---|---|
| CN | 106713773 A | 5/2017 |
| CN | 108235736 A | 6/2018 |
| WO | WO2014111923 A1 | 7/2014 |

* cited by examiner

Using the IMU to acquire predicted position and attitude information of the terminal device with respect to the marked object at various time points, wherein predicted information of the various time points may be acquried — 810

When the first information of the first time point is acquired, the first information may be used to update the predicted information of The first time point to acquire first predicted information, such that the predicted information after the first time point may be reacquired — 820

When the second information of the second time point is acquired, the second information may be used to update the predicted information of the second time point to acquire second predicted information, and the predicted information after the second time point may be reacquried — 830

The present predicted information may be used as target information — 840

FIG. 8

METHOD OF DEVICE TRACKING, TERMINAL DEVICE, AND STORAGE MEDIUM

CROSS-REFERENCE TO RELATED APPLICATIONS

The present application is a continuation-application of International (PCT) Patent Application No. PCT/CN2019/098200 filed on Jul. 29, 2019, which claims foreign priorities of Chinese Patent Application No. 201810891134.5, filed on Aug. 2, 2018, and Chinese Patent Application No. 201910642093.0, filed on Jul. 16, 2019, the entire contents of which are hereby incorporated by reference in their entireties.

TECHNICAL FIELD

The present disclosure relates to the technical field of object tracking, and in particular to a method of device tracking, a terminal device, and a non-transitory computer-readable storage medium.

BACKGROUND

As technologies of virtual reality (VR) and augmented reality (AR) develop, using the augmented reality as an example, the augmented reality is a technology to augment a user's perception of a real world by providing information generated from a computer system to the user. A virtual object, a virtual scene, or a systemic message generated by the computer may be superimposed onto a real scene, in order to augment and modify perception of an environment of the real world, or augment or modify the perception of data indicating the environment of the real world. Therefore, how to track a display (such as a head mounted display, smart glasses, a smart phone, or the like) accurately and effectively is a problem to be solved.

SUMMARY OF THE DISCLOSURE

According to embodiments of the present disclosure, a method of device tracking, a terminal device, and a computer-readable storage medium may be provided.

According to a first aspect, embodiments of the present disclosure may provide a method of device tracking performed by a terminal device having a first camera, a secondI camera and an inertial measurement unit (IMU). The method includes: acquiring first information based on a first image including a marker captured by the first camera, wherein the first information comprises relative position and pose between the first camera and the marker; acquiring second information based on a second image including a target scene captured by the second camera, wherein the second information comprises position and pose of the second camera in the target scene, wherein the marker and the terminal device are located in the target scene; and updating position and pose of the IMU relative to the marker based on at least one of the first information and the second information to determine position and pose of the terminal device relative to the marker.

According to a second aspect, embodiments of the present disclosure may provide a terminal device, including: a first camera, arranged to capture a first image including a marker; a second camera, arranged to capture a second image including a target scene; an inertial measurement unit (IMU), arranged to acquire position and pose of the IMU relative to the marker; a non-transitory memory, arranged to store one or more computer programs; and one or more processors, arranged to execute the one or more computer programs to perform operations of the method described in the first aspect.

According to a third aspect, embodiments of the present disclosure may provide a non-transitory computer storage medium, having a method of device tracking stored therein. The method is capable of being executed by a system, and the system at least comprises a processor, a first camera, a second camera, and an inertial measurement unit (IMU). The method is capable of being executed the processor of the system to perform operations as described in the first aspect of the present disclosure.

BRIEF DESCRIPTION OF THE DRAWINGS

FIG. 8 is a flow chart showing acquisition of position and pose of a terminal device relative to a marker according to an embodiment of the present disclosure.

DETAILED DESCRIPTION

Figure 1:
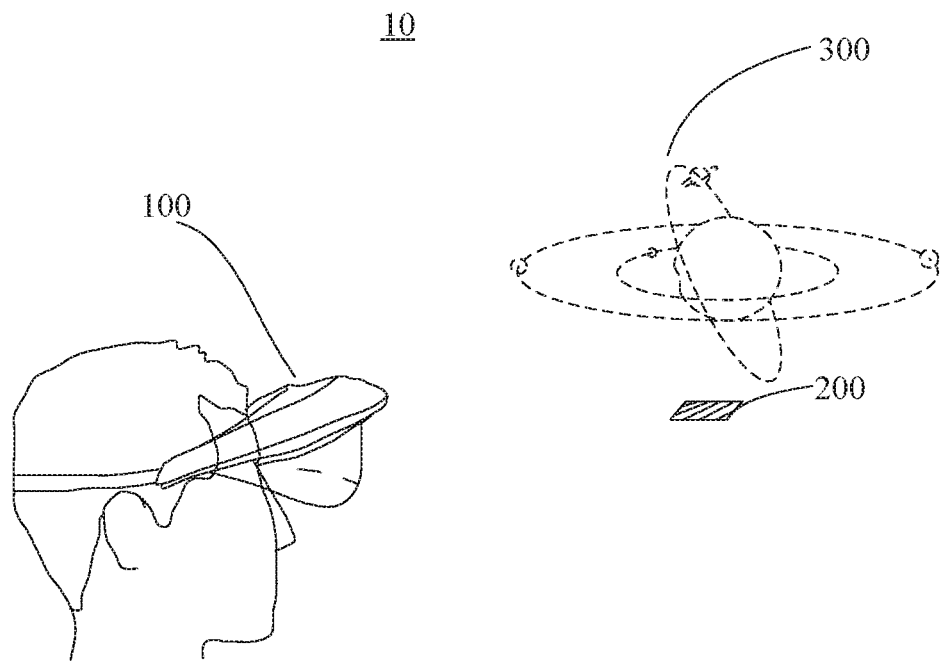
FIG. 1 is an application scene in which a tracking system may be applied according to an embodiment of the present disclosure.

As shown in FIG. 1, an embodiment of the present disclosure may provide a tracking system 10, including a terminal device 100, and a marker 200. The terminal device 100 may be a head mounted display, a mobile phone, a tablet or other mobile devices. When the terminal device 100 is a head mounted display, the head mounted display may be an integrated head mounted display. The terminal device 100 may also be a head mounted display connected to an exterior electronic apparatus. The terminal device 100 may further be a smart terminal, such as a mobile phone, exteriorly connected to or plugged into a head mounted display, that is, the terminal device 100 may be regarded as a processor device and a storage device of the head mounted display, and may be plugged into or connected to the head mounted display exteriorly, such that the head mounted display may display virtual content 300.

Figure 2:
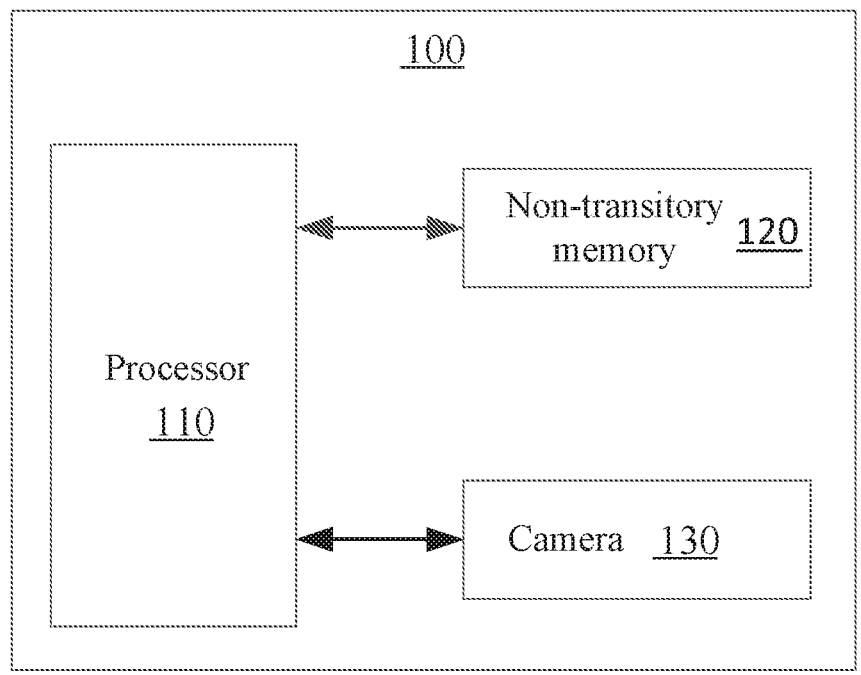
FIG. 2 is a structural diagram of a terminal device according to an embodiment of the present disclosure.

As shown in FIG. 2, the terminal device 100 may be a head mounted display, including a processor 110 and a non-transitory memory 120. The non-transitory memory may have one or more application program stored therein. The one or more application program may be executed by one or more processor 110. The one or more application program may be executed to perform a method as described in the present disclosure.

The processor 110 may include one or more processing core. The processor 110 may use various interfaces and lines to connect various portions in the electronic device 100. By running or executing an instruction, a program, a code set, or an instruction set which may be stored in the non-transitory memory 120, and by invoking data stored in the non-transitory memory 120, various functions of the electronic device 100 may be performed, and data may be processed. The processor 110 may be realized in at least one form of hardware including a digital signal processor (DSP), a field-programmable gate array (FPGA), and a programmable gate array (PLA). The processor 110 may integrate at least one of a central processing unit (CPU), a graphics processing unit (GPU), a modem, and the like, or a combination thereof. The CPU may substantially handle an operating system, a user interface, applications, and the like. The GPU may be arranged to render and draw display content. The modem may be arranged to handle with wireless communication. The modem may be realized as a communication chip independently, instead of being integrated into the processor 110.

The non-transitory memory 120 may include a random access memory or a read-only memory. The non-transitory memory 120 may be configured to store an instruction, a program, a code, a code set, or an instruction set. The non-transitory memory 120 may include a program storage area and a data storage area. The program storage area may store an instruction to implement an operating system, an instruction to perform at least one function (such as a touch, an audio display function, an image display function, and the like), an instruction to perform various methods as described in embodiments hereafter, and the like. The data storage area may store data generated during usage of the terminal device 100.

In some embodiments, the terminal device 100 may further include a camera 130, configured to capture an image of a real object and an image of a target scene. The camera 130 may be an infrared camera or a visible-light camera. A specific type of the camera may not be limited.

In an embodiment, the terminal device may include one or more of following components: a display module, an optical module, a communication module, and a power. The display module may include a display control unit. The display control unit may be configured to receive a displayed image of virtual content rendered by a processor, and the displayed image may be displayed and projected to the optical module, such that a user may observe the virtual content through the optical module. The display module may be a display screen, a projection apparatus, or the like which is configured to display images. The optical module may use an off-axis optical system or a waveguide optical system, and the displayed image displayed by the display module may be projected to eyes of the user through the optical module. In some implementations, the user may observe a real environment through optical module, having a visual effect of the virtual content superimposed onto the real environment. The communication module may be a Bluetooth, Wireless Fidelity (Wi-Fi), ZigBee, or other modules. The terminal device may communicate with and connect to an interactive device through the communication module to perform interaction of messages and instructions. The power may supply power to the entire terminal device, ensuring that all components of the terminal device may operate normally.

In some embodiments, the marker may be a pattern or an object having any recognizable features and marks, for example, the marker may have a topological pattern. The topology may refer to a connective relation between a sub-marker and a feature of the marker. A specific marker may not be limited. As an implementation, an infrared filter may be arranged at an outside of the marker. The marker may be invisible to a user, and the camera may be an infrared camera. By emitting infrared light, an image of the marker may be captured, and an impact of visible light on the image of the marker may be reduced, improving accuracy of tracking.

When the marker 200 is located within a visual range of the camera of the terminal device 100, the camera may capture an image containing the marker 200. A processor of the terminal device 100 may acquire the image of the marker and related information, recognize the marker 200 contained in the image, and acquire identity of the marker 200 and position and pose of the terminal device 100 relative to the marker 200.

Figure 3:
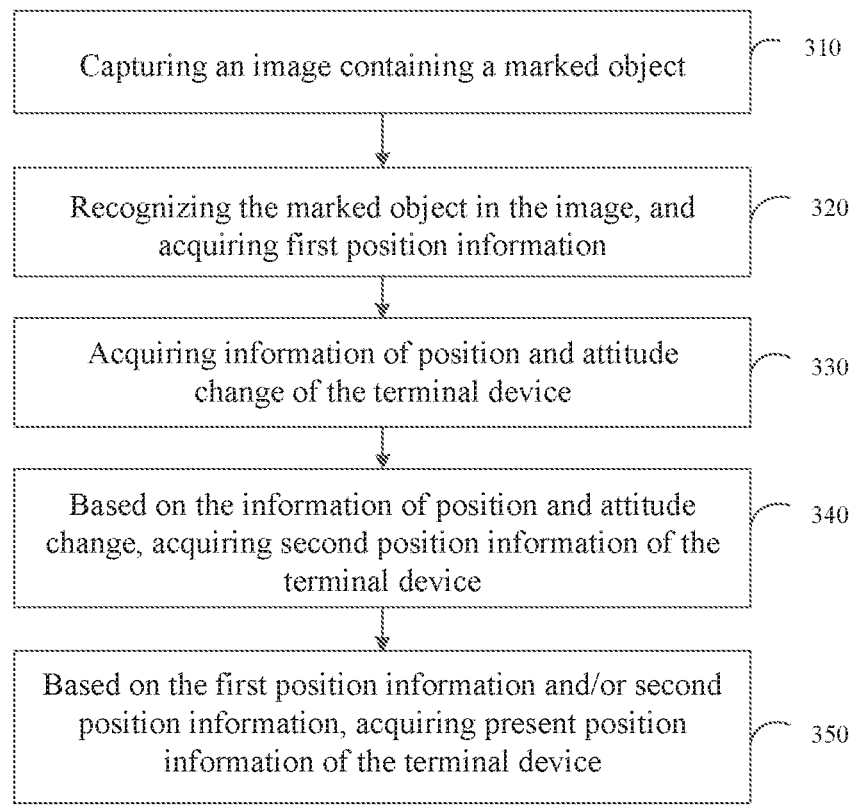
FIG. 3 is a flow chart showing a method of device tracking according to an embodiment of the present disclosure.

As shown in FIG. 3, an embodiment of the present disclosure may provide a method of device tracking, which is performed by a terminal device 100. The method may include following blocks.

At block 310, an image containing a marker may be captured.

At block 320, the marker in the image may be recognized, and first spatial position may be acquired.

The terminal device may capture the image containing the marker by a camera, and recognize the marker in the image to acquire position and pose of the terminal device relative to the marker, and then further acquire position and pose of the terminal device in a real scene, that is, the first spatial position is acquired.

In some embodiments, a plurality of markers may be scattered around at various positions of the real scene. One of the plurality of markers may be treated as a target marker, and may be arranged at a position near an entrance of the real scene, for example, at a door of a room, or near an entrance of a region. By capturing the image containing the target marker, the terminal device in the real scene may be initially positioned. On this occasion, the position of the terminal device which is determined based on the target marker may be the initial position of the terminal device in the real scene.

At block 330, change information of position and pose of the terminal device may be acquired.

In some embodiments, since the markers are not placed across all areas, when a user is moving in the real scene, the camera of the terminal device may not capture a marker-contained image, change information of position and pose of the terminal device relative to the initial position and pose may be acquired to deduce a present position of the terminal device.

At block 340, second spatial position of the terminal device may be acquired based on the change information of position and pose.

As an implementation, the terminal device may use a visual-inertial odometer (VIO) to acquire position and pose of the terminal device in the real scene at real time, that is, to acquire the second spatial position. The terminal device may use the camera to capture an image of the real scene at real time. Based on critical points (or feature points) contained in the image of the real scene, the position and pose of the terminal device in the real scene may be calculated. When the user is wearing the terminal device and enters the real scene, a marker positioned near an entrance of the real scene may be detected by the terminal device, and the first spatial position may be acquired. The first spatial position may be used as a basis for subsequently calculate positions of the terminal device by the VIO. When the user continues moving in the real scene, a position change and a pose change of the user relative to the first spatial position may be acquired by the VIO at real time, wherein the first spatial position refers to a relation of the terminal device relative to the target marker.

At block 350, present position of the terminal device may be acquired based on at least one of the first spatial position and the second spatial position.

As an implementation, when the terminal device acquires only one of the first spatial position and the second spatial position, the acquired position may be directly used as the present position of the terminal device. Alternatively, the terminal device may combine the first spatial position and the second spatial position to acquire the present position of the terminal device.

For example, when the terminal device acquires the first spatial position based on the image containing the marker, the first spatial position may be used as the present position of the terminal device directly. When the terminal device does not capture an image containing the marker, but acquires the second spatial position through the VIO, the second spatial position may be used as the present position of the terminal device directly. When the terminal device acquires the first spatial position based on the image containing the marker captured by the camera, and also acquires the second spatial position by the VIO, the first spatial position which is more accurate may be used as the present position of the terminal device. Alternatively, the acquired first spatial position and the acquired second spatial position may be fused, for example, being calculated by weighing, to obtain the present position of the terminal device.

Figure 4:
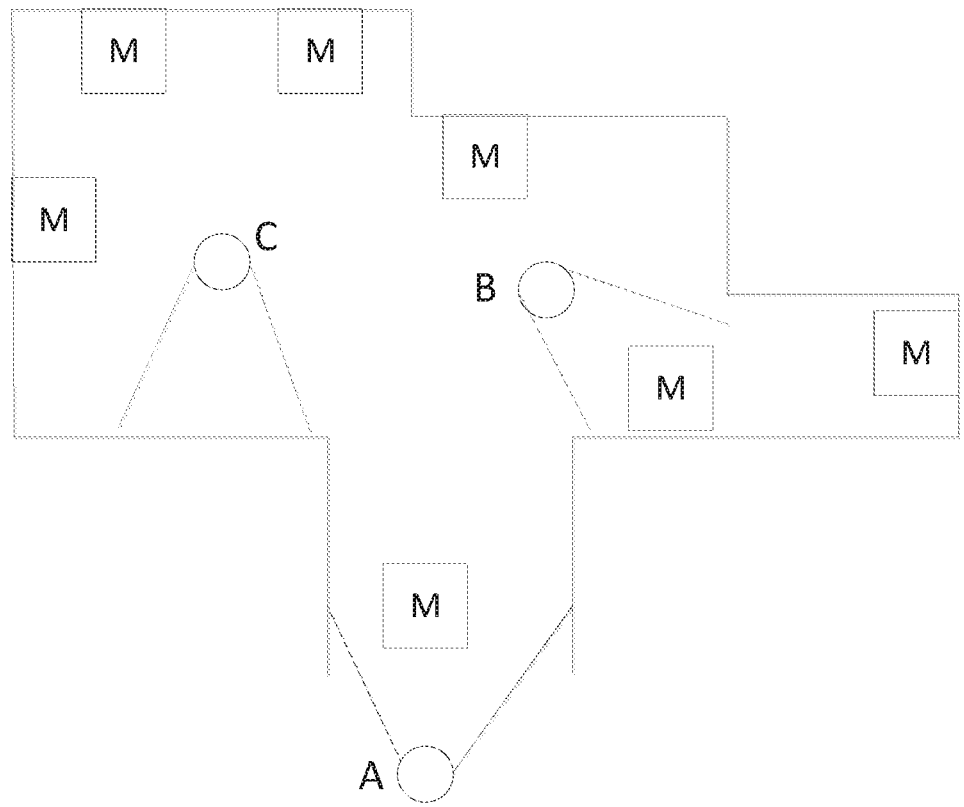
FIG. 4 is an application scene of a method of device tracking according to an embodiment of the present disclosure.

As shown in FIG. 4, in a scene of an augmented reality museum, the number and positions of markers M are relatively fixed, and the museum may define a relatively large space, the markers may be scattered around. When the terminal device has recognized and tracked a marker, for example, a position at which user A is located and a position at which user B is located, a virtual image corresponding to the recognized and tracked marker may be displayed, and position and pose of the terminal device in the museum may be determined based on the marker. When the terminal device carried by the user is moving in the museum, the camera of the terminal device may not be able to capture an image containing the marker occasionally, for example, a position at which user C is located, the terminal device may acquire the change information of position and pose of the terminal device relative to the first spatial position through the VIO at real time, wherein the first spatial position may be acquired latest, such that the position and pose of the terminal device in the museum may be determined.

As an implementation, when the camera of the terminal device cannot capture an image containing the marker, the terminal device may acquire a related virtual image based on the present location information acquired by the VIO, and render the virtual image for display. In this way, when the terminal device cannot detect any marker, a virtual image related to the position and the pose may still be displayed.

According to the above-mentioned embodiments, the method of device tracking may track and determine a user's position based on a marker. When the marker is not detectable, the terminal device may calculate the user's position based on the change information of position and pose acquired by the VIO. By fusing the positioning based on markers with the positioning through the VIO, the terminal device may accurately acquire the user's position at real time to improve accuracy of tracking indoors.

Figure 5:
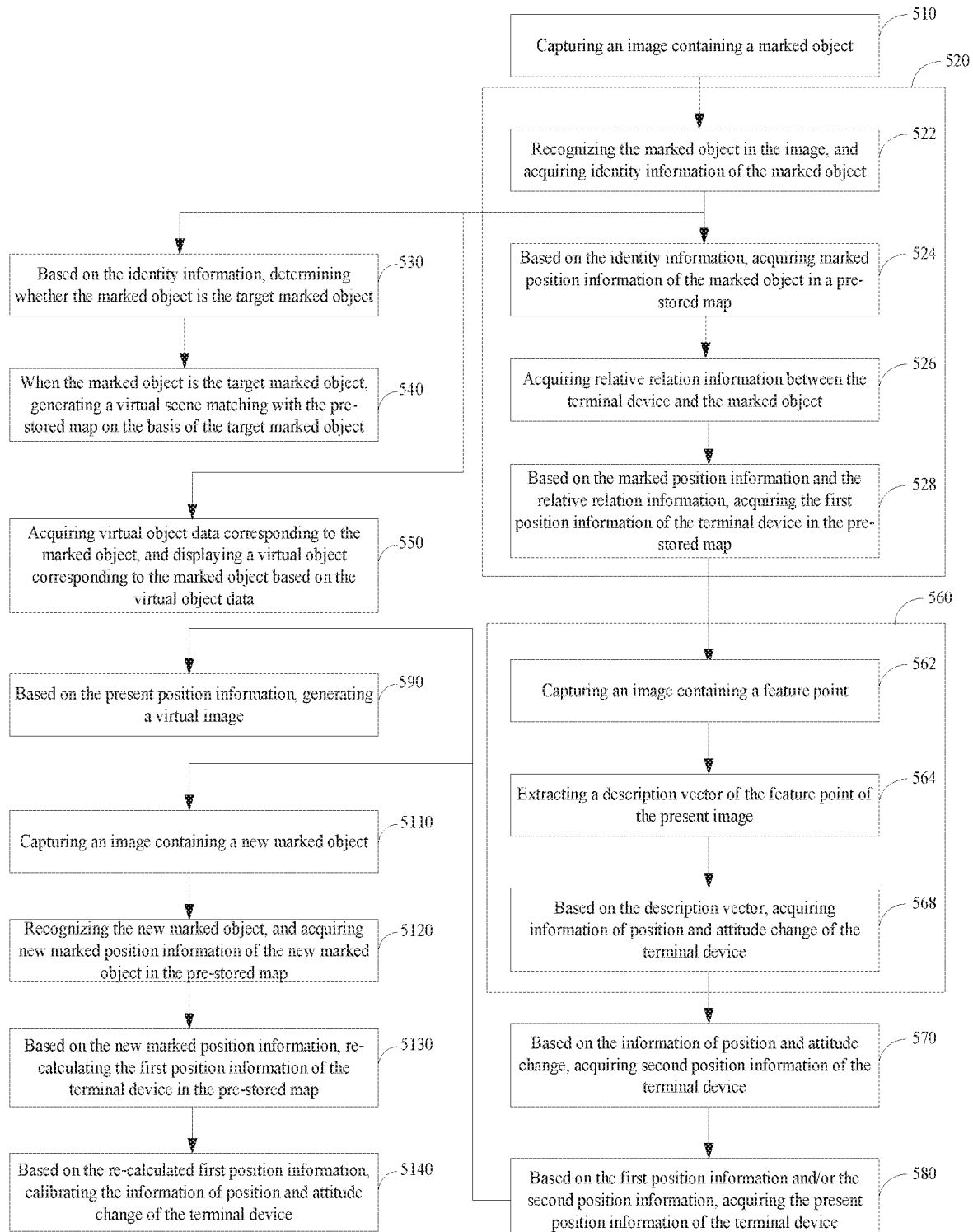
FIG. 5 is a flow chart showing a method of device tracking according to another embodiment of the present disclosure.

As shown in FIG. 5, a method of device tracking may be provided by the present disclosure. The method may be performed by the terminal device and include following blocks.

At block 510, an image containing a marker may be captured.

At block 520, the marker in the image may be recognized, and a first spatial position may be acquired. Further, the block 520 may include blocks 522-S528.

At block 522, the marker in the image may be recognized, and identity of the marker may be acquired.

The terminal device may recognize the image containing the marker and acquire the identity of the marker. Different markers may correspond to different identity. The identity may be represented by at least one of a number, a letter, and a symbol. The identity of the marker may be set based on patterns and colors, shapes, topology, and other features of the marker, which is not limited herein.

At block 524, a position of the marker in a pre-stored map may be acquired based on the identity of the marker.

Each marker may correspond to a unique identity, and each of the unique identity may correspond to the position of the each marker in the pre-stored map. After acquiring the identity of the marker, the terminal device may acquire the position of the marker in the pre-stored map based on the identity. As an implementation, the pre-stored map may be a virtual map generated and stored in advance based on a real environment, the position of the marker in the pre-stored map may refer to an actual position of the marker in the real environment.

In some embodiments, identities of a plurality of markers and marked position corresponding to each marker may be stored locally in the terminal device or stored on the server. Based on acquired identity of a marker, a position of the marker may be searched locally or on the server.

At block 526, relative relation between the terminal device and the marker may be acquired.

Based on the captured image containing the marker, the terminal device may acquire the relative relation between the terminal device and the marker. The relative relation may include relative position and relative pose between the terminal device and the marker.

At block 528, the first spatial position of the terminal device in the pre-stored map may be acquired based on the position of the marker and the relative relation.

The terminal device may combine the position of the marker in the pre-stored map with the relative relation between the terminal device and the marker to determine the current position and pose of the terminal device in the real scene, that is, the first spatial position may be acquired.

In one embodiment, after the 522, 530 and 540 may further be provided.

At block 530, the marker may be determined to be a target marker or a non-target marker based on the identity of the marker.

At block 540, when the marker is a target marker, a virtual scene matching with the pre-stored map may be generated based on the target marker.

After the terminal device acquires the identity of the marker, the terminal device may detect the identity of the marker and determine whether the marker is a target marker. When the marker is the target marker, the terminal device may generate a virtual scene corresponding to the pre-stored map based on the target marker, and display the virtual scene.

As an implementation, different target markers may be placed at a boundary between different real scenes shown in the augmented reality environment. For example, in an augmented reality museum, there may be multiple exhibition scenes, such as an ocean scene, grassland scene, a starry sky scene, and the like. A target marker may be placed at an entrance of each scene respectively. When the terminal device captures the target marker located at the entrance of the real scene having the theme of ocean, the terminal device may generate a virtual scene related to the ocean based on the target marker. When the user moves from the scene having the theme of ocean to the scene having the theme of starry sky, the terminal device may capture the target marker located at the entrance of the real scene having the theme of the starry sky, and then generate a virtual scene related to the starry sky based on the target marker to replace the former virtual scene related to the ocean. The related virtual scene may be displayed to the user through the display module of the terminal device.

In one embodiment, a block 550 may further be performed after the block 522.

At block 550, virtual object data corresponding to the marker may be acquired, and a virtual object corresponding to the marker may be displayed based on the virtual object data.

The identity of each marker may be in one-to-one correspondence with a virtual object bound with each marker. The terminal device may acquire identity of a marker, and acquire virtual object data corresponding to the marker based on the identity. Based on the virtual object data and position and pose of the terminal device relative to the marker, the terminal device may generate and display a virtual object. As an implementation, the virtual object corresponding to the marker may be displayed independently, or displayed accompanying with the virtual scenes. For example, in an augmented reality museum, the marker may be placed adjacent to an exhibition. The terminal device may capture an image containing the marker and display the virtual object related to the exhibition, such as a text introduction of the exhibition, a virtual animation related to the exhibition, a virtual mini-game, or the like. The user may observe the virtual object superimposed onto the real scene to be displayed cooperatively.

Further, a block 560 may be performed after the block 520, i.e., after the blocks 522 to 528.

At block 560, change information of position and pose of the terminal device may be acquired.

In some embodiments, the 560 may include 562, 564, and 566.

At block 562, an image of a scene containing feature points may be captured.

The feature point may be a point in the image having an obvious feature, such as a point of an edge or a point of a corner of an object in the image, wherein the point may show a position at which the feature point is located. As an implementation, multi-frame images of the real scene may be captured over a certain period of time, each frame of the image of the real scene may include a plurality of feature points for positioning.

At block 564, a description vector of the feature point of the present image may be extracted.

The terminal device may extract positions of a same feature point in two images captured in two adjacent frames, such that the terminal device may extract the description vector indicating the feature point from a former position in an image of a former frame to a next position of in an image of a next frame.

At block 566, the change information of position and pose of the terminal device may be acquired based on the description vector.

After the terminal device extracts the description vector of the feature point, the terminal device may acquire a time interval between the two images captured at the two adjacent frames and a modulus length and a direction of the description vector, and calculate a spatial displacement of the feature point relative to the camera of the terminal device during the time interval between the two frames, such that the change information of position of the terminal device may be acquired. The terminal device may further be arranged with an inertial measurement unit (IMU), and acquire the change information of pose of the terminal device at real time through the IMU.

Further, blocks 570 and 580 may be performed after the block 560, i.e., after the block 566.

At block 570, second spatial position of the terminal device may be acquired based on the change information of position and pose.

At block 580, the present position of the terminal device may be acquired based on the first spatial position and/or the second spatial position.

In one embodiment, after the S580, S590 may further be provided.

At block 590, a virtual image may be generated based on the current position.

The terminal device may generate and display a virtual picture corresponding to the present spatial position and pose of the terminal device in the real scene. For example, in the augmented reality museum, the terminal device may display a dynamic landmark line corresponding to the present position and pose of the terminal device, leading the user to look for a next marker or a virtual exhibition. As an implementation, the position of the terminal device in the real scene may be related to the virtual picture in advance, and such relation between the position and the virtual image may be stored in the terminal device locally or stored in server.

In one embodiment, after the S580, S5110, S5120, S5130, and S5140 may further be provided.

At block 5110, an image containing a new marker may be captured.

At block 5120, the new marker may be recognized, and position of the new marker in the pre-stored map may be acquired.

At block 5130, the first spatial position of the terminal device in the pre-stored map may be re-calculated based on the position of the new marker.

At block 5140, the change information of position and pose of the terminal device may be calibrated based on the re-calculated first spatial position.

In some cases, a deviation may be generated during continually measuring the change information of position and pose by the VIO, and the terminal device may calibrate the change information of position and pose of the VIO by calculating the position based on the captured new marker. In this way, the change information of position and pose acquired by the VIO may be re-calculated using the new marker as a reference to improve accuracy of tracking.

In some embodiments, when the terminal device captures a new marker, the change information of position and pose acquired by the VIO may be cleared to zero. The new marker may be used as the reference to re-calculate the change information of position and pose. In another implementation, the terminal device may acquire the position and pose of the terminal device relative to the new marker, and further acquire relative position and pose between the new marker and the target marker. The terminal device may calculate the position and pose of the terminal device relative to the target marker, and calibrate the change information of position and pose acquired by the VIO. Compared with the implementation which allows the information acquired by the VIO to be cleared directly, the VIO in the latter implementation may have a response curve. Based on the data of the marker, the terminal device may gradually calibrate the change information of position and pose of the VIO, and images displayed on the terminal device may not be abruptly changed to provide better visual experience to the user.

According to above-mentioned embodiment, the method of device tracking may allow the terminal device to display dynamic virtual images in accordance with changes of present positions of the terminal device to improve a sense of immersion. The present change information of position and pose may be calibrated when a new marker is captured to improve accuracy of positioning.

Figure 6:
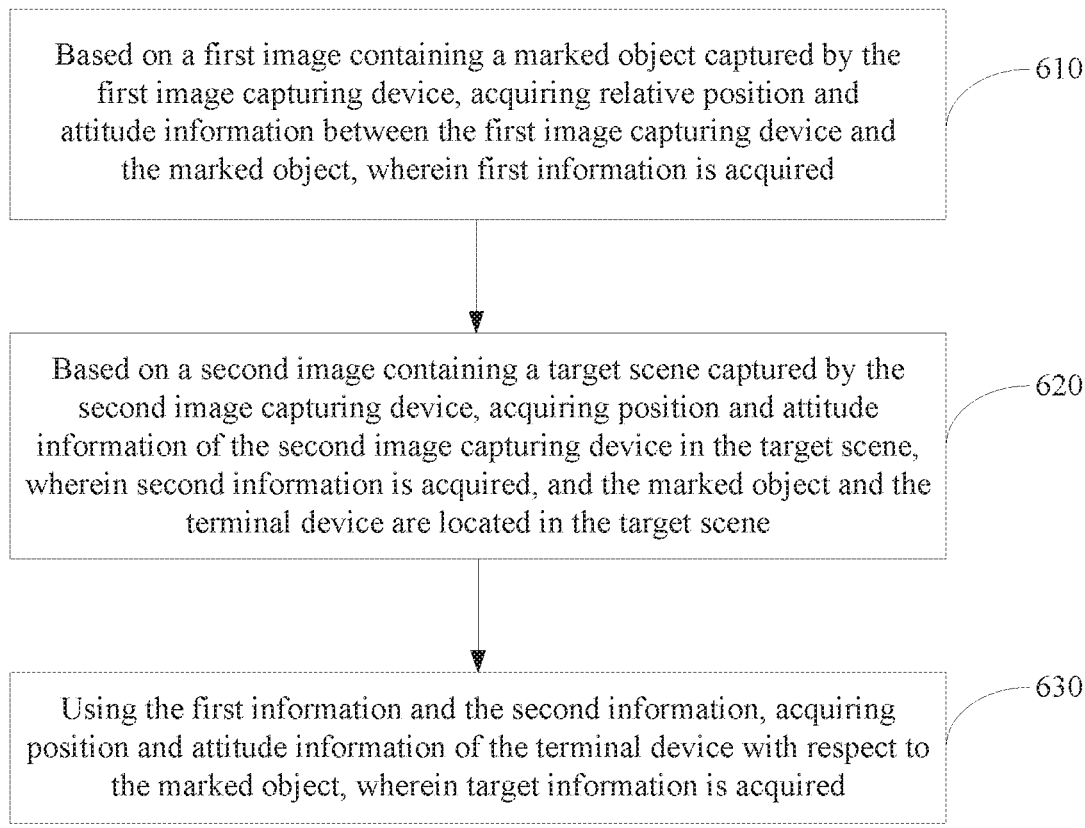
FIG. 6 is a flow chart showing a method of device tracking according to still another embodiment of the present disclosure.

As shown in FIG. 6, the present disclosure may further provide a method of device tracking. The method may be performed by a terminal device and include blocks of 610 to 630.

At block 610, relative position and pose between a first camera and a marker may be acquired based on a first image containing the marker captured by the first camera, that is, first information may be acquired.

The first camera may be arranged on the terminal device to capture an image containing a marker. Based on the captured image, the position and pose of the first camera relative to the marker may be determined, that is, Six Degrees of Freedom (6DOF) information of the first camera relative to the marker may be determined. The 6DOF may include three translational degrees of freedom and three rotational degrees of freedom. The three translational degrees of freedom may indicate coordinate values of X, Y, and Z of a three dimensional object, and the three rotational degrees of freedom may include a pitch, a roll, and a yaw.

At block 620, position and pose of a second camera in a target scene may be acquired based on a second image containing the target scene captured by the second camera, that is, second information may be acquired. The marker and the terminal device may both be located within the target scene.

Figure 7:
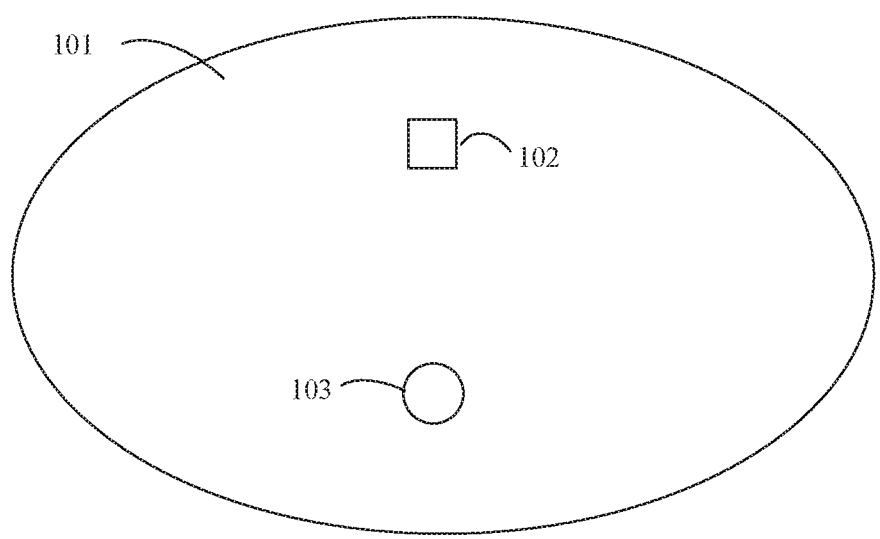
FIG. 7 is a diagram showing relations among a terminal device, a marker, and a target scene according to an embodiment of the present disclosure.

The second camera may be arranged on the terminal device to capture an image of the target scene within a visual range. As shown in FIG. 7, the marker 102 and the terminal device 103 may both be placed in the target scene 101, the first camera of the terminal device 103 may be configured to capture an image containing the marker 102, and the second camera may be configured to capture an image of the target scene.

Based on the image of the scene, the terminal device may acquire position and pose of the second camera in the target scene, that is, the second information may be acquired. The terminal device may use the VIO to calculate and acquire the second information, and acquire an angular velocity and acceleration of the terminal device through the IMU. By combining with the image of the scene captured by the second camera, the terminal device may acquire the position and pose of the second camera in the target scene.

At block 630, position and pose of the terminal device relative to the marker may be acquired based on the first information and the second information, that is, target information may be acquired.

To be specific, position and pose of the IMU relative to the marker may be acquired and updated based on at least one of the first information and the second information to further determine the position and pose of the terminal device relative to the marker. Based on the position and pose of the first camera relative to the marker, and the position and pose of the second camera in the target scene, the terminal device may acquire the position and pose of the terminal device relative to the marker, that is, acquire the target information. In one embodiment, the first camera and second camera may both be arranged on the terminal device, the first information between the first camera and the marker may be used as the target information, alternatively, the second information showing the second camera in the target scene may be used as the target information.

In order to acquire more accurate and effective target information, the terminal device may combine the first information and the second information to acquire the target information. For example, a mean value of the first information and the second information may be used as the target information. Alternatively, different weights may be assigned to the first information and the second information, and weighted calculation of the first information and the second information may be performed. In some implementations, the terminal device may acquire the position and pose of the terminal device relative to the marker through the IMU, and update the position and pose acquired by the IMU with at least one of the first and the second information, such that the target information may be acquired.

According to the above-mentioned embodiment, the method of device tracking may acquire the target information of the terminal device relative to the marker based on the first information acquired by the first camera and the second information acquired by the second camera, such that the tracking of the terminal device may be more accurate.

In one embodiment, as shown in FIG. 8, the terminal device may use the first and the second information to acquire the position and pose of the terminal device relative to the marker, that is, to acquire the target information, and such operation may include following operations.

At block 810, predicted position and pose of the terminal device relative to the marker at various time points may be acquired through the IMU, and predicted information of the various time points may be acquired.

In some implementations, the IMU may use a gyro to measure an angular change of each of the three rotational degrees of freedom, and use accelerometer to measure displacement of each of the three translational degrees of freedom. A position change and a pose change of the terminal device may be accumulated through the IMU, such that the position and pose of the terminal device relative to the marker at various time points may be predicted. After the terminal device acquires the predicted information of a former time point through the IMU, the terminal device may acquire the predicted information of a present time point by performing integrals and the predicted information of the former time point. The predicted information of the present time point may be set as the position and pose of the terminal device relative to the marker at the present time point.

At block 820, under a condition of the first information of a first time point being acquired, the terminal device may update the predicted information of the first time point with the first information, such that first predicted information of the first time point may be acquired, and the predicted information of other time points after the first time point may be reacquired.

Based on a first image captured at the first time point, the terminal device may acquire relative position and pose between the first camera and the marker, that is, the first information of the first time point is acquired, the terminal device may update the predicted information acquired by the IMU at the first time point with the first information to acquire the first predicted information, wherein the first predicted information may be the predicted information of other time points after the first time point. Based on the first predicted information, the IMU may reacquire the predicted information of various time points after the first time point.

In some implementations, when the IMU is in an initial state, an image containing a marker may be captured by the first camera, and relative position and pose between the first camera and the marker may be acquired. Based on a first physical relation between the first camera and the IMU, the relative position and pose between the first camera and the marker may be transformed to obtain the relative position and pose between the IMU and the marker. The relative position and pose between the IMU and the marker may be initial position and pose of the terminal device relative to the marker, and may also be initial predicted information of the IMU. Based on the initial predicted information, the IMU may predict the position and pose of the terminal device relative to the marker at various time points. When the IMU is in the initial state, and the first camera does not capture the first image, the IMU may not acquire the initial position and pose of the terminal device relative to the marker, and the IMU may remain in a waiting state.

Figure 9:
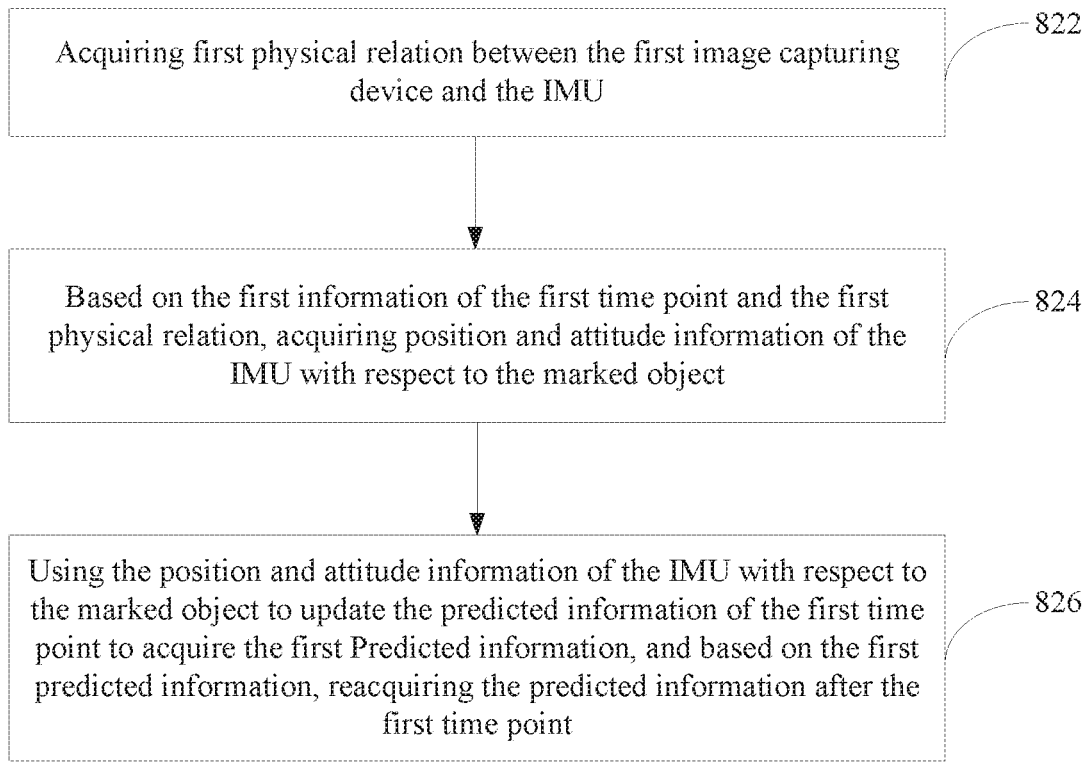
FIG. 9 is a flow chart of updating predicted information based on first information of a first moment according to an embodiment of the present disclosure.

In some implementations, as shown in FIG. 9, the S820 may further include blocks 822 to 826.

At block 822, a first physical relation between the first camera and the IMU may be acquired.

The first physical relation between the first camera and the IMU may refer to a relation showing how the first camera and the IMU are structurally arranged relative to each other. The relation may include a distance, an orientation, and other information between the first camera and the IMU. The relation may be acquired by an actual measurement, acquired from a value of a structural design, or acquired by performing calibration. The relation may reflect rotational magnitude and displacement magnitude of the first camera relative to the IMU, or reflect rotational magnitude and displacement magnitude of the IMU relative to the first camera. The rotational magnitude and the displacement magnitude may indicate a rotational angle and a translation distance required to coincide a spatial coordinate system of the first camera with a spatial coordinate system of the IMU. The spatial coordinate system of the first camera may be established with a central point of the first camera as an origin, the spatial coordinate system of the IMU may be established with a central point of the IMU as an origin. The coordinate system is not limited as being established with the central point as the origin.

At block 824, the position and pose of the IMU relative to the marker may be acquired based on the first information of the first time point and the first physical relation.

The first camera and the IMU may both be arranged on the terminal device. Based on the first physical relation between the first camera and the IMU, a mapping relation may be acquired between the first camera and the marker. Based on the first physical relation, the terminal device may transform the relative position and pose between the first camera and the marker at the first time point to acquire the position and pose of the IMU relative to the marker of the first time point.

At block 826, the predicted information of the first time point may be updated with the position and pose of the IMU relative to the marker, and the first predicted information may be acquired.

In one implementation, based on the position and pose of the IMU relative to the marker at the first time point and the predicted information of the first time point, the terminal device may acquire an updating parameter. The updating parameter may be a deviation value between the position and pose of the IMU relative to the marker at the first time point and the predicted information of the first time point. Based on the updating parameter, the predicted information of the first time point may be updated. In another implementation, a weighted calculation may be performed to the position and pose of the IMU relative to the marker at the first time point and the predicted information of the first time point to obtain updated predicted information, a weight used in the weighted calculation may be set according to an actual demand.

In some implementations, based on the first predicted information of the first time point, the terminal device may reacquire the predicted information of other time points after the first time point. On the basis of the first predicted information, the terminal device may integrate the position and pose change of the terminal device at each time point after the first time point to reacquire the predicted information of the each time point after the first time point.

In some implementations, the terminal device may update and correct the first physical relation between the first camera and the IMU to achieve a more accurate first physical relation. Updating the first physical relation may include blocks (1) to (3).

At block (1), the terminal device may use the first physical relation and the first predicted information to predict the relative position and pose between the first camera and the marker to acquire first data.

In an embodiment, the terminal device may use the first physical relation between the first camera and the IMU to perform coordinate transformation of the first predicted information of the first time point. The terminal device may re-calculate the relative position and pose between the first camera and the marker, and acquire the first data.

At block (2), the terminal device may acquire an error between the first information of the first time point and the first data.

The terminal device may acquire an error between the first data of the first time point and confirmed actual relative position and pose of the first camera relative to the marker (the first information). In some embodiments, the terminal device may calculate a difference value between the first information of the first time point and the first data, and take an absolute value of the difference value to obtain the error between the first information and the first data.

At block (3), the first physical relation may be updated based on the error.

The error between the first information of the first time point and the first data may substantially refer to an error between an actual value and a predicted value of the relative position and pose between the first camera and the marker. The terminal device may update the first physical relation based on the error between the first information and the first data to improve accuracy of the tracking. The smaller the error between the first information and the first data, the more accurate the first physical relation. In an embodiment, the number of updates of the first physical relation may be acquired. The terminal device may determine whether the number of updates is greater than a predefined value. When the number of updates is greater than the predefined value, the update of the first physical relation may be terminated.

At block 830, under a condition of the second information of the second time point being acquired, the terminal device may update the predicted information of the second time point with the second information, such that second predicted information of the second time point may be acquired, and the predicted information of other time points after the second time point may be reacquired.

Based on an image of a scene captured by the second camera at the second time point, the terminal device may acquire position and pose of the second camera in the target scene, wherein the position and pose of the second camera in the target scene may be the second information of the second time point. The terminal device may use the second information of the second time point to update the predicted information at the second time point predicted by the IMU, to acquire the second predicted information, wherein the second predicted information may be the predicted information of the second time point after the updating. In some implementations, based on the second predicted information of the second time point, the terminal device may reacquire the predicted information of other time points after the second time point, and the IMU may perform integrals to the second predicted information to reacquire the predicted information of each time point after the second time point.

Figure 10:
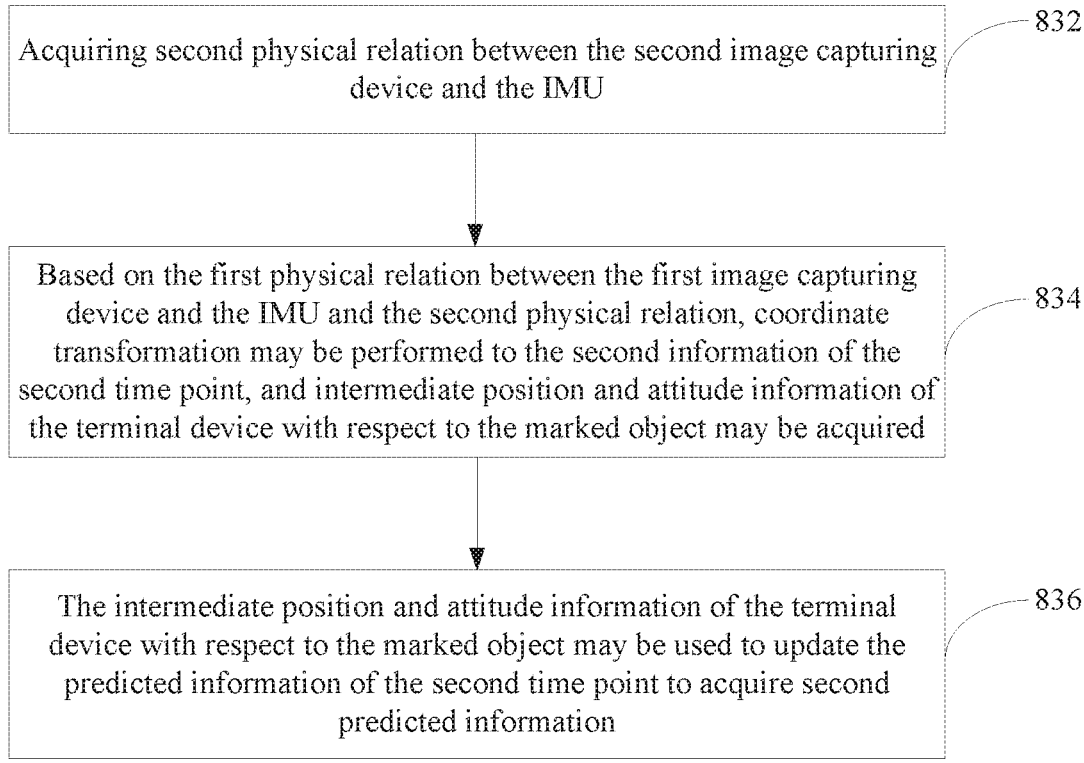
FIG. 10 is a flow chart of updating predicted information based on second information of a second moment according to an embodiment of the present disclosure

In an embodiment, as shown in FIG. 10, the S830 may further include blocks 832 to 836.

At block 832, a second physical relation between the second camera and the IMU may be acquired.

The second physical relation between the second camera and the IMU may refer to a relation showing how the second camera and the IMU are structurally arranged relative to each other. The relation may include rotation and displacement relations between the second camera and the IMU. The relation may be acquired by an actual measurement, acquired from a value of a structural design, or acquired by calibration. The second physical relation may reflect rotational magnitude and displacement magnitude of the second camera relative to the IMU, or reflect rotational magnitude and displacement magnitude of the IMU relative to the second camera. The rotational magnitude and the displacement magnitude may indicate a rotational angle and a translation distance required to coincide a spatial coordinate of the second camera with a spatial coordinate of the IMU. The spatial coordinate system of the second camera may be established with a central point of the second camera as an origin, the spatial coordinate system of the IMU may be established with a central point of the IMU as an origin. The coordinate system is not limited as being established with the central point as the origin.

At block 834, the terminal device may use the first physical relation between the first camera and the IMU and the second physical relation to perform coordinate transformation of the second information of the second time point, and may acquire position and pose of the IMU relative to the marker.

Based on the first physical relation between the first camera and the IMU, and based on the second physical relation between the second camera and the IMU, the terminal device may acquire a third physical relation between the first camera and the second camera. When the first camera captures an image containing a marker, the terminal device may acquire the relative position and pose between the first camera and the marker based on the image. The terminal device may then use the third physical relation to perform coordinate transformation of the relative position and pose of the first camera relative to the marker to acquire the relative position and pose between the second camera and the marker. The relative position and pose between the second camera and the marker may be used as initial position and pose of the second camera relative to the marker. When the second camera captures an image of the target scene at the second time point, the terminal device may acquire the position and pose of the second camera in the target scene based on the image of the target scene. Based on the initial position and pose of the second camera relative to the marker, the terminal device may transform the position and pose of the second camera in the target scene into the relative position and pose between the second camera and the marker. Based on the second physical relation, a relative relation between the IMU and the marker at the second time point may be acquired.

At block 836, the terminal device may use the position and pose of the IMU relative to the marker to update the predicted information of the second time point, and may acquire second predicted information.

Based on the first physical relation, the second physical relation, and the second information of the second time point, the terminal device may acquire the position and pose of the IMU relative to the marker at the second time point. The terminal device may use the position and pose to update the predicted information of the second time point to acquire the second predicted information.

In some implementations, the terminal device may update the second physical relation between the second camera and the IMU, including blocks (a) to (c).

At block (a), the terminal device may use the second physical relation and the second predicted information to predict the position and pose of the second camera in the target scene to acquire second data.

In an embodiment, the terminal device may use the second physical relation between the second camera and the IMU to perform coordinate transformation of updated predicted information of the second time point. The position and pose of the second camera in the target scene at the second time point may be re-calculated, and the second data may be acquired.

At block (b) the terminal device may acquire an error between the second information of the second time point and the second data.

The terminal device may acquire an error between the second data of the second time point and confirmed actual position and pose (the second information) of the second camera in the target scene. In some embodiments, the terminal device may calculate a difference value between the second information of the second time point and the second data, and take an absolute value of the difference value to acquire the error between the second information of the second time point and the second data.

At block (c), the terminal device may update the second physical relation based on the error.

The error between the second information of the second time point and the second data may refer to an error between an actual value and a predicted value of the position and pose of the second camera in the target scene. The terminal device may use the error between the second information and the second data to update the second physical relation to improve accuracy of the tracking.

At block 840, the terminal device may use the predicted information of a present time point as target information.

The terminal device may use the predicted information of the present time point acquired by the IMU as position and pose of the terminal device relative to the marker at the present time point. The position and pose of the terminal device relative to the marker at the present time point may be the target information. The predicted information of each time point may be used as the target information corresponding to the each time point.

Figure 11:
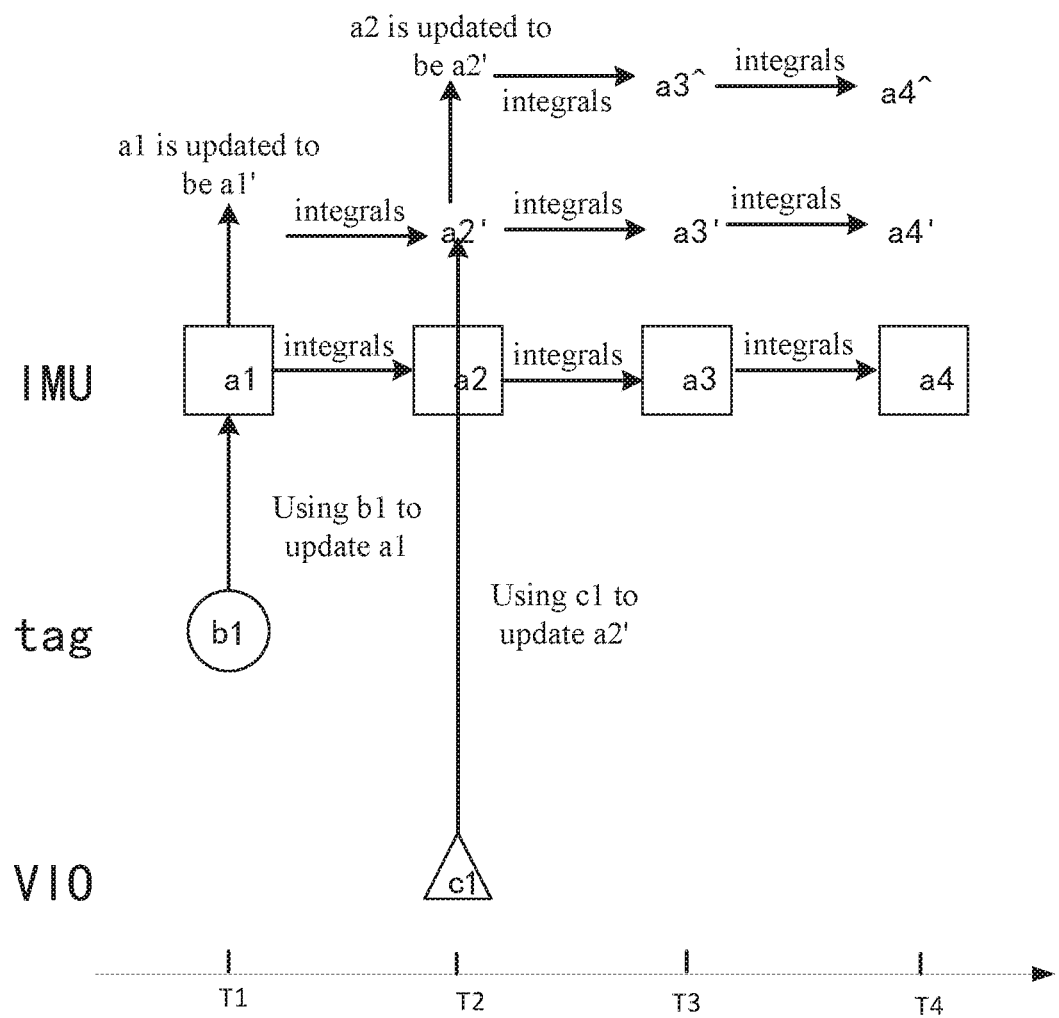
FIG. 11 is an exemplary diagram showing acquisition of position and pose of a terminal device relative to a marker according to an embodiment of the present disclosure.

As shown in FIG. 11, an embodiment of the present disclosure may provide a procedure of acquiring the target information during tracking. Procedures corresponding to "IMU" may include using the IMU to acquire the predicted information of the terminal device relative to the marker at various time points, procedures corresponding to "tag" may include acquiring the position and pose based on the image of the marker, and procedures corresponding to "VIO" may represent acquiring the position and pose by a VIO algorithm. a1, a2, a3, and a4 may respectively represent the predicted information at the time point of T1, T2, T3, and T4 acquired by the IMU. The predicted information of a latter time point may be obtained by performing integrals to the predicted information of a former time point. The integrals may refer to integrals of acceleration and pose angles acquired by the IMU.

The first camera may capture an image containing a marker at the time point T1, and acquire the first information. Based on the physical relation between the first camera and the IMU, the first information may be transformed into position and pose b1 of the IMU relative to the marker at the time point T1. The predicted information of the IMU at the time point T1 may be updated to obtain a1' base on b1. The IMU may use the updated a1' of the time point T1 to re-perform the integrals of the predicted information of each time point after the time point T1 to acquire the predicted information a2' of the time point T2, the predicted information a3' of the time point T3, and the predicted information a4' of the time point T4. The second camera may capture a second image containing a target scene and acquire the second information. Using the second physical relation between the second camera and the IMU, the second information may be transformed into position and pose c1 of the IMU relative to the marker at the time point T2. Based on the c1, the predicted information a2' of the time point T2 may be updated to obtain a2^. Using the updated a2^ of the time point T2, integrals of the predicted information of each time point after the time point T2 may be re-performed, such that the predicted information a3^ of the time point T3 and the predicted information a4^ of the time point T4 may be acquired. The latest predicted information of each time point of the IMU may be used as the position and pose of the terminal device relative to the marker at each corresponded time point.

Therefore, according to the above-mentioned embodiment, the method includes: determining predicted information at various time points via the IMU, wherein the predicted information is the position and pose of the IMU relative to the marker at the various time points calculated by the terminal device; and taking the predicted information of a present time point of the IMU as the position and pose of the terminal device relative to the marker. Under a condition of the first information of a first time point being acquired, updating the predicted information of the first time point, based on the first information, to determine first predicted information, and re-calculating the predicted information of other time points after the first time point via the IMU based on the first predicted information, such that updating the position and pose of the terminal device relative to the marker. Under a condition of the second information of a second time point being acquired, updating the predicted information of the second time point, based on the second information, to determine second predicted information, and re-calculating the predicted information of other time points after the second time point via the IMU based on the second predicted information, such that updating the position and pose of the terminal device relative to the marker.

According to the above-mentioned embodiment, the method of device tracking may introduce the first physical relation between the first camera and the IMU and the second physical relation between the second camera and the IMU, in order to update the predicted information of a target time point. It may further ensure the accuracy of the position and pose of the terminal device relative to the marker.

Figure 12:
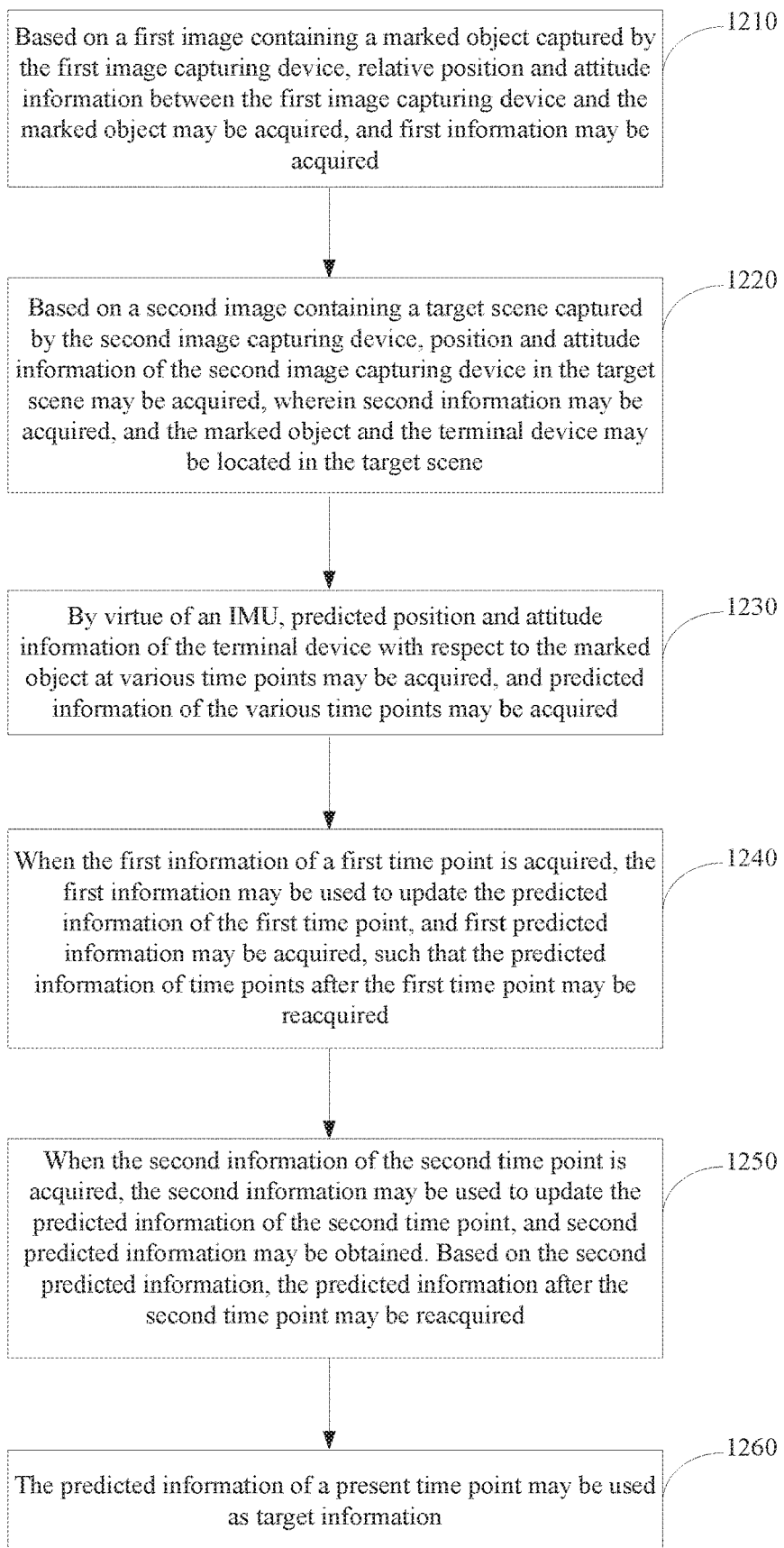
FIG. 12 is a flow chart showing a method of device tracking according to an embodiment of the present disclosure.

As shown in FIG. 12, in another embodiment, a method of device tracking is provided and performed by a terminal device. The terminal device may include a microprocessor and a processor. The first camera may be connected to the microprocessor, and the second camera may be connected to the processor. The method may include blocks 1210 to 1260.

At block 1210, relative position and pose between the first camera and the marker may be acquired based on a first image containing a marker captured by the first camera, that is, first information may be acquired.

At block 1220, position and pose of the second camera in the target scene may be acquired based on a second image containing a target scene captured by the second camera, that is, second information may be acquired. The marker and the terminal device may be located in the target scene.

At block 1230, predicted position and pose of the terminal device relative to the marker at various time points may be acquired via an IMU, and predicted information of the various time points may be acquired.

At block 1240, when the first information of the first time point is acquired, the first information may be used to update the predicted information of the first time point, and first predicted information may be acquired, such that the predicted information of time points after the first time point may be reacquired.

Figure 13:
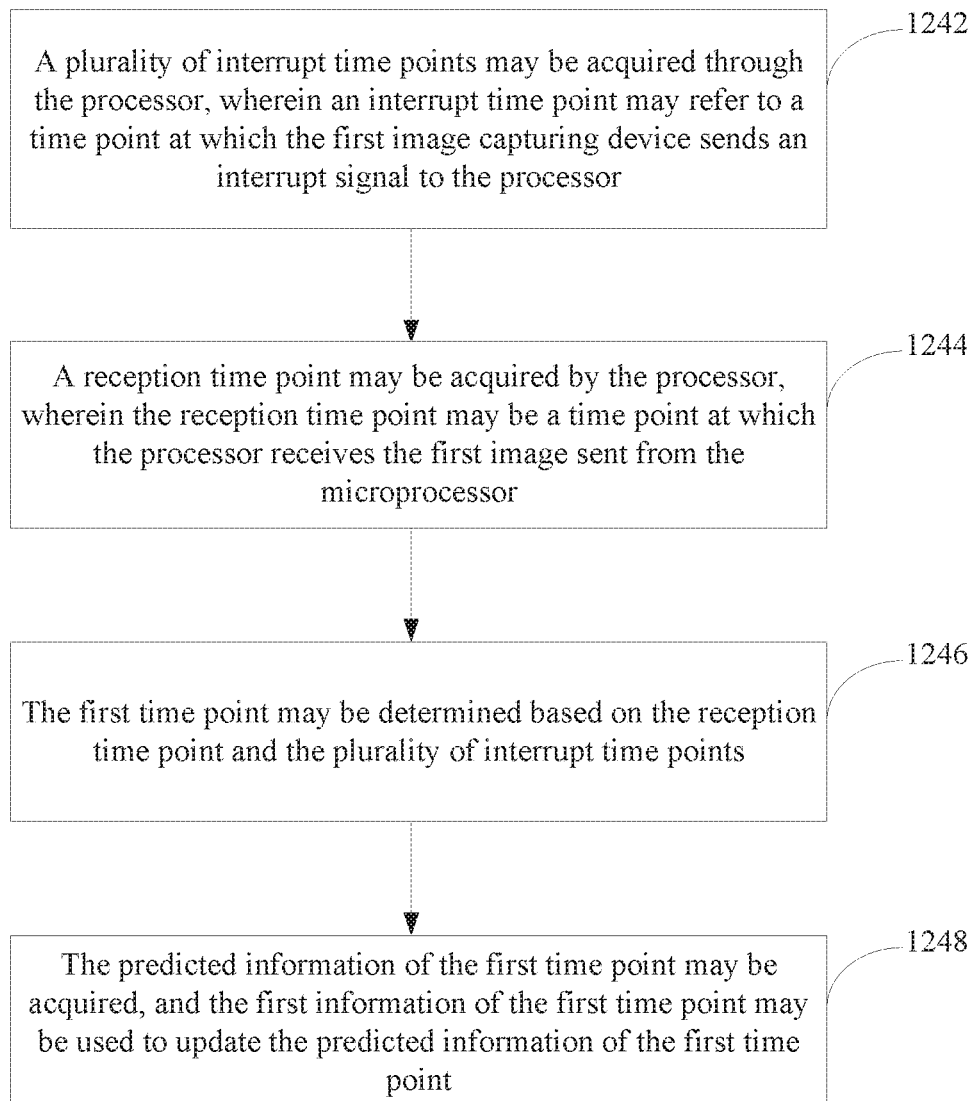
FIG. 13 is a flow chart showing determination of a first moment according to an embodiment of the present disclosure.

In an embodiment, as shown in FIG. 13, the block 1240 may further include blocks 1242 to 1248.

At block 1242, a plurality of interrupt time points may be acquired through the processor. An interrupt time point may refer to a time point at which the first camera sends an interrupt signal to the processor.

Figure 14:
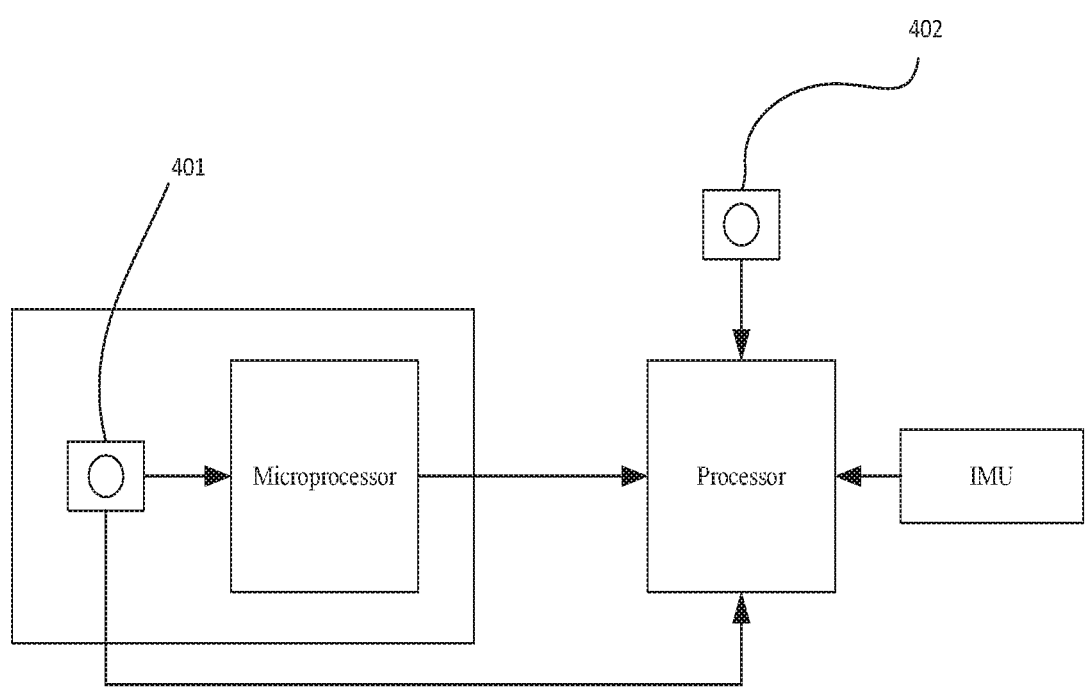
FIG. 14 is a structural diagram showing connections between components of a terminal device according to an embodiment of the present disclosure.

In an embodiment, connections among the first camera, the second camera, the microprocessor, and the processor may be shown in FIG. 14. The first camera 401 may be connected to the microprocessor, the second camera 402 may be connected to the processor, and the IMU may be connected to the processor. As the processor and the microprocessor may be provided as two independent components, having two independent time systems, it may be required to synchronize data of the processor and data of the microprocessor, such that the first information of the first time point may be used to update the predicted information of the first time point.

At each time when the first camera captures the first image containing the marker, the first camera may send an interrupt signal to the processor, such as a universal input/output interrupt signal. The processor may record and store a time point at which the interrupt signal is received. As a delay between the time point at which the processor receives the interrupt signal and the time point at which the first camera sends the interrupt signal may be minor and may be negligible, the time point at which the processor receives the interrupt signal may be used as the time point at which the first camera sends the interrupt signal to the processor, and it may also be the interrupt time point. The first camera capturing the image containing the marker may be a process of continuously capturing multiple frames of images, involving a plurality of times of exposures. Each time of exposure may generate an interrupt, and that is capturing each frame may generate an interrupt, and the processor may acquire a plurality of interrupt time points during the process.

At block 1244, a reception time point may be acquired by the processor. The reception time point may be a time point at which the processor receives the first image sent from the microprocessor.

The first camera may capture the first image, and the first image may be processed by the microprocessor, for example, for imaging. The microprocessor may send the processed first image to the processor, and the processor may record a time point at which the first image of each frame is received, and that is the reception time point of the first image.

At block 1246, a first time point may be determined based on the reception time point and the plurality of interrupt time points. The first time point may be a time point at which the first camera captures the first image.

In some implementations, there may be delay duration $\Delta T$ during the first camera transmitting the first image to the processor. The delay duration may include duration of processing the first image t1 and duration of transmission t2. The duration of processing the first image t1 may refer to time that the microprocessor consumes to process the first image. In an embodiment, the duration of processing the first image t1 may relate to a frame rate of an image sensor of the first camera. The higher the frame rate of the image sensor, the shorter the duration of processing the first image t1. The duration of transmission t2 may refer to time consumed for the first image to be transmitted from the microprocessor to the processor. The delay duration $\Delta T$ may be a sum of the duration of processing the first image t1 and the duration of transmission t2, and that is dT=t1+t2.

Based on the reception time point of receiving the first image and the delay duration, the processor may acquire a theoretical exposure time point of the first image. In an embodiment, the theoretical exposure time point of the first image may be acquired by subtracting the delay duration from the reception time point. That is, the delay duration $\Delta T$ may be a difference value between the theoretical exposure time point of the first image Ta and the reception time point Tb, and that is Ta=Tb−$\Delta T$.

The processor may store the plurality of interrupt time points at which the first camera sends a plurality of interrupt signals, and calculate a difference value between the theoretical exposure time point of the first image and each of the plurality of interrupt time points. The processor may determine whether the difference value between the theoretical exposure time point of the first image and each of the plurality of interrupt time points is smaller than a predefined threshold value. The interrupt time point which has a corresponded difference value smaller than the predefined threshold may be used as the time point at which the first camera captures the first image, that is, the first time point may be determined.

To be exemplary, the processor may store a plurality of interrupt time points Tc1, Tc2, Tc3, Tc4, and so on. The processor may calculate difference values $\Delta t1$, $\Delta t2$, $\Delta t3$, and $\Delta t4$ between the theoretical exposure time point Ta and Tc1, Tc2, Tc3, and Tc4, respectively, and determine whether the difference values $\Delta t1$, $\Delta t2$, $\Delta t3$, and $\Delta t4$ is smaller than the predefined threshold value Th. The interrupt time point which has a corresponded difference value smaller than the predefined threshold value Th may be used as the time point at which the first camera captures the first image.

In some implementations, when a plurality of interrupt time points have corresponded difference values smaller than the predefined threshold value Th, as an actual delay duration may be greater than a theoretical delay duration, the processor may further determine whether the plurality of interrupt time points are earlier than the theoretical exposure time point. The interrupt time points earlier than the theoretical exposure time point may be used as the time point at which the first camera captures the first image. For example, the reception time point Tb of the processor receiving the first image is at the time point of 100 ms, the delay duration $\Delta T$ is 30 ms, the theoretical exposure time point Ta of the first image is at the time point of (Tb−$\Delta T$=) 70 ms. The interrupt time points Tc1, Tc2, Tc3, Tc4, and Tc5 recorded by the processor may be at the time points of 20 ms, 40 ms, 60 ms, 80 ms, and 100 ms respectively. Difference values between the theoretical exposure time point Ta and the interrupt time points Tc1, Tc2, Tc3, Tc4, and Tc5 may be calculated respectively to be 50 ms, 30 ms, 10 ms, 10 ms, and 30 ms. The predefined threshold value may be set as Th=15 ms. The interrupt time points Tc3 and Tc4 may have corresponded difference values smaller than the threshold value, and the theoretical exposure time point Ta may further be compared with Tc3 and Tc4. The interrupt time point Tc3 which is not later than 7b may be selected to be the time point at which the first camera captures the first image, and the first time point may be the time point at 60 ms.

After the processor acquires the time point at which the first camera captures the first image, the predicted information corresponding to the time point may be acquired and updated.

At block 1248, the predicted information of the first time point may be acquired, and the first information of the first time point may be used to update the predicted information of the first time point.

At block 1250, when the second information of the second time point is acquired, the second information may be used to update the predicted information of the second time point, and second predicted information may be obtained. Based on the second predicted information, the predicted information after the second time point may be reacquired.

At block 1260, the predicted information of a present time point may be used as target information.

In some implementations, the processor may send an instruction for time point synchronization to the microprocessor at a certain time point. The instruction for time point synchronization may include clock time of the processor. The instruction for time point synchronization may instruct the microprocessor to adjust clock time of the microprocessor based on the clock time of the processor, such that the clock of the processor and the clock of the microprocessor may be synchronized. After the microprocessor receives the instruction for time point synchronization, the microprocessor may calculate a time error between the microprocessor and the processor based on present clock time, the clock time of the processor, and delay of signal transmission between the processor and the microprocessor, and may adjust the present clock time based on the time error.

The method of device tracking provided in the above-mentioned embodiment may achieve data synchronization between the microprocessor and the processor, in order to ensure the accuracy of the results of tracking.

In an embodiment, the present disclosure may provide a non-transitory computer-readable storage medium. The non-transitory computer-readable storage medium may store a program code, and the program code may be invoked by the processor to perform the method as described in the above-mentioned embodiments.

The non-transitory computer readable storage medium may be an electronic non-transitory memory, such as a flash memory, an Electrically Erasable Programmable Read Only Memory (EEPROM), an Erasable Programmable Read Only Memory (EPROM), a hard disc, a Read-Only Memory (ROM), or the like. Alternatively, the non-transitory computer readable storage medium may include a nonvolatile non-transitory computer readable medium. The non-transitory computer readable storage medium may have a storage space to store program codes, wherein the program codes may allow execution of any method and block of the above-described methods. The program codes may be read from one or more computer program products, or may be written into the one or more computer program products. The program codes may be compressed by appropriate means for instance.

It should be noted that the above embodiments are only for purposes of illustrating the technical solutions of the present application, but not to limit the present disclosure. Although the present disclosure is described in detail with reference to the foregoing embodiments, ordinary skilled in the related art shall understand that they may modify the technical solutions described in the foregoing embodiments, or equivalently substitute some of the technical features. The modifications or substitutions do not drive the essence of the corresponding technical solutions to depart from the spirit and scope of the technical solutions of the embodiments of the present disclosure.

What is claimed is:

1. A method for device tracking performed by a terminal device having a first camera, a second camera, inertial measurement unit (IMU), a microprocessor connected to the first camera, and a processor connected to the second camera, the method comprising:
   acquiring first information based on a first image including a marker captured by the first camera, wherein the first information comprises relative position and pose between the first camera and the marker;
   acquiring second information based on a second image including a target scene captured by the second camera, wherein the second information comprises position and pose of the second camera in the target scene, wherein the marker and the terminal device are located in the target scene; and
   updating position and pose of the IMU relative to the marker based on at least one of the first information and the second information to determine position and pose of the terminal device relative to the marker, comprising:
   determining predicted information at various time points via the IMU, wherein the predicted information is the position and pose of the IMU relative to the marker at the various time points calculated by the terminal device; and
   taking the predicted information of a present time point of the IMU as the position and pose of the terminal device relative to the marker; wherein
   under a condition of the first information of a first time point being acquired, acquiring a plurality of interrupt time points through the processor, wherein an interrupt time point is a time point at which the first camera sends an interrupt signal to the processor; acquiring a reception time point through the processor, wherein the reception time point is a time point at which the processor receives the first image sent from the microprocessor; determining the first time point based on the reception time point and the plurality of interrupt time points; and determining the predicted information of the first time point, and updating the predicted information of the first time point based on the first information of the first time point and
   re-calculating the predicted information of other time points after the first time point via the IMU based on the first predicted information, such that updating the position and pose of the terminal device relative to the marker.

2. The method of claim 1, wherein, when the IMU is in an initial state, the method further comprising:
   determining whether the first camera captures the first image;
   when the first camera captures the first image, acquiring initial position and pose of the terminal device relative to the marker base on the first image; and
   when the first camera dose not capture the first image, remaining the IMU in a waiting state.

3. The method of claim 1, wherein the determining predicted information at various time points via the IMU comprising:
   acquiring a predicted information of a former time point via the IMU;
   acquiring, by performing integrals to the predicted information of the former time point, the predicted information of the present time point of the IMU.

4. The method of claim 1, wherein the determining the first time point based on the reception time point and the plurality of interrupt time points comprises:
   acquiring delay duration between a time point at which the first camera captures the first image and a time point at which the processor receives the first image, wherein the delay duration is a sum of duration of processing the first image and duration of transmission;
   determining an exposure time point of the first image based on the reception time point and the delay duration;
   calculating a difference value between the exposure time point and each of the plurality of interrupt time points and determining whether the difference value is smaller than a predefined threshold value; and
   setting the interrupt time point which is earlier than the exposure time point and has a corresponded difference value smaller than the predefined threshold value to be the first time point.

5. The method of claim 1, further comprising:
sending an instruction of time point synchronization to the microprocessor through the processor, wherein the instruction of time point synchronization comprises clock time of the processor, and the instruction of time point synchronization is arranged to instruct the microprocessor to adjust the clock time of the microprocessor based on the clock time of the processor.

6. The method of claim 1, wherein the
taking the predicted information of a present time point of the IMU as the position and pose of the terminal device relative to the marker further comprises:
under a condition of the second information of a second time point being acquired, updating the predicted information of the second time point, based on the second information, to determine second predicted information, and re-calculating the predicted information of other time points after the second time point via the IMU based on the second predicted information, such that updating the position and pose of the terminal device relative to the marker.

7. The method of claim 6, wherein the updating the predicted information of a first time point, based on the first information, to determine first predicted information comprises:
acquiring a first physical relation between the first camera and the IMU;
determining the position and pose of the IMU relative to the marker based on the first information of the first time point and the first physical relation; and
updating the predicted information of the first time point, based on the position and pose of the IMU relative to the marker, to determine the first predicted information.

8. The method of claim 7, wherein the updating the predicted information of the second time point, based on the second information, to determine second predicted information comprises:
acquiring a second physical relation between the second camera and the IMU;
performing coordinate transformation of the second information of the second time point, based on the first physical relation and the second physical relation, to determine intermediate information, wherein the intermediate information is the position and pose of the terminal device relative to the marker; and
updating the predicted information of the second time point based on the intermediate information to determine the second predicted information.

9. The method of claim 8, wherein the performing coordinate transformation of the second information of the second time point, based on the first physical relation and the second physical relation, to determine intermediate information comprises:
determining a third physical relation between the first camera and the second camera based on the first physical relation and the second physical relation;
performing the coordinate transformation based on the first information and the third physical relation to determine relative position and pose between the second camera and the marker;
taking the relative position and pose between the second camera and the marker as initial position and pose; and determining the intermediate information base on the initial position and pose by performing a visual-inertial odometer (VIO) algorithm.

10. The method of claim 8, wherein the method further comprising:
re-calculating the relative position and pose of the second camera in the target scene based on the second physical relation and the second predicted information to obtain second data;
obtaining an error between the second information of the second time point and the second data; and
updating the second physical relation based on the error.

11. The method of claim 7, wherein the method further comprising:
re-calculating the relative position and pose between the first camera and the marker based on the first physical relation and the first predicted information to obtain first data;
obtaining an error between the first information of the first time point and the first data; and
updating the first physical relation based on the error.

12. The method of claim 11, wherein after the updating the first physical relation based on the error, the method further comprising:
acquiring the number of updating of the first physical relation;
determining whether the number of updating is greater than a predefined value;
when the number of updating is greater than the predefined value, terminating the updating of the first physical relation.

13. The method of claim 7, wherein the first physical relation between the first camera and the IMU comprises a relation showing how the first camera and the IMU are structurally arranged relative to each other, wherein the relation comprises a distance, an orientation, and other information between the first camera and the IMU.

14. The method of claim 7, wherein the updating the predicted information of the first time point, based on the position and pose of the IMU relative to the marker, to determine the first predicted information comprising:
performing a weighted calculation to the position and pose of the IMU relative to the marker at the first time point and the predicted information of the first time point to obtain updated predicted information.

15. A terminal device, comprising:
a first camera, arranged to capture a first image including a marker;
a second camera, arranged to capture a second image including a target scene;
an inertial measurement unit (IMU), arranged to acquire position and pose of the IMU relative to the marker;
a non-transitory memory, arranged to store one or more computer programs; and
one or more processors, arranged to execute the one or more computer programs to perform operations of:
acquiring first information based on a first image including a marker captured by the first camera, wherein the first information comprises relative position and pose between the first camera and the marker;
acquiring second information based on a second image including a target scene captured by the second camera, wherein the second information comprises position and pose of the second camera in the target scene, wherein the marker and the terminal device are located in the target scene; and
updating the position and pose of the IMU relative to the marker based on at least one of the first information and the second information to determine position and pose of the terminal device relative to the marker, comprising:

determining predicted information at various time points via the IMU, wherein the predicted information is the position and pose of the IMU relative to the marker at the various time points calculated by the terminal device; and taking the predicted information of a present time point of the IMU as the position and pose of the terminal device relative to the marker; wherein under a condition of the first information of a first time point being acquired, acquiring a first physical relation between the first camera and the IMU;

determining the position and pose of the IMU relative to the marker based on the first information of the first time point and the first physical relation; and updating the predicted information of the first time point, based on the position and pose of the IMU relative to the marker, to determine the first predicted information;

re-calculating the relative position and pose between the first camera and the marker based on the first physical relation and the first predicted information to obtain first data;

obtaining an error between the first information of the first time point and the first data;

updating the first physical relation based on the error; and re-calculating the predicted information of other time points after the first time point via the IMU based on the first predicted information, such that updating the position and pose of the terminal device relative to the marker.

16. The terminal device of claim 15, wherein the terminal device further comprises a microprocessor and a processor, the first camera is connected to the microprocessor, and the second camera is connected to the processor; and before the updating the predicted information of the first time point, based on the position and pose of the IMU relative to the marker, to determine the first predicted information, the one or more processors are further arranged to execute the one or more computer programs to perform operations of:

acquiring a plurality of interrupt time points through the processor, wherein an interrupt time point is a time point at which the first camera sends an interrupt signal to the processor;

acquiring a reception time point through the processor, wherein the reception time point is a time point at which the processor receives the first image sent from the microprocessor;

determining the first time point based on the reception time point and the plurality of interrupt time points; and determining the predicted information of the first time point.

17. The terminal device of claim 15, wherein, during the taking the predicted information of a present time point of the IMU as the position and pose of the terminal device relative to the marker, the one or more processors are further arranged to execute the one or more computer programs to perform operations of:

under a condition of the second information of a second time point being acquired, updating the predicted information of the second time point, based on the second information, to determine second predicted information, and re-calculating the predicted information of other time points after the second time point via the IMU based on the second predicted information, such that updating the position and pose of the terminal device relative to the marker.

18. The terminal device of to claim 17, wherein, during the updating the predicted information of the second time point, based on the second information, to determine second predicted information, the one or more processors are further arranged to execute the one or more computer programs to perform operations of: acquiring a second physical relation between the second camera and the IMU;

performing coordinate transformation of the second information of the second time point, based on the first physical relation and the second physical relation, to determine intermediate information, wherein the intermediate information is the position and pose of the terminal device relative to the marker; and updating the predicted information of the second time point based on the intermediate information to determine the second predicted information.

19. The terminal device of claim 18, wherein, after the updating the predicted information of the second time point based on the intermediate information to determine the second predicted information, the one or more processors are further arranged to execute the one or more computer programs to perform operations of:

re-calculating the relative position and pose of the second camera in the target scene based on the second physical relation and the second predicted information to obtain second data;

obtaining an error between the second information of the second time point and the second data; and updating the second physical relation based on the error.

20. A non-transitory computer storage medium, having a method of device tracking stored in, wherein the method is capable of being executed by a system, the system at least comprises a processor, a first camera, a second camera, and an inertial measurement unit (IMU), and the method comprises operations of:

acquiring first information based on a first image including a marker captured by the first camera, wherein the first information comprises relative position and pose between the first camera and the marker;

acquiring second information based on a second image including a target scene captured by the second camera, wherein the second information comprises position and pose of the second camera in the target scene, wherein the marker and the terminal device are located in the target scene;

determining predicted information at various time points via the IMU, wherein the predicted information is the position and pose of the IMU relative to the marker at the various time points calculated by the terminal device; and taking the predicted information of a present time point of the IMU as the position and pose of the terminal device relative to the marker; wherein under a condition of the first information of a first time point being acquired, acquiring a first physical relation between the first camera and the IMU; determining the position and pose of the IMU relative to the marker based on the first information of the first time point and the first physical relation; updating the predicted information of the first time point, based on the position and pose of the IMU relative to the marker, to determine the first predicted information; and re-calculating the predicted information of other time points after the first time point via the IMU based on the first predicted information, such that updating the position and pose of the terminal device relative to the marker; and under a condition of the second information of a second time point being acquired, acquiring a second physical relation between the second camera and the IMU; performing coordinate transformation of the second information of the second time point, based on the first physical relation and the second physical relation, to determine intermediate information, wherein the intermediate information is the position and pose of the terminal device relative to the marker; updating the predicted information of the second time point based on the intermediate information to determine the second predicted information; and re-calculating the predicted information of other time points after the second time point via the IMU based on the second predicted information, such that updating the position and pose of the terminal device relative to the marker.

* * * * *